(12) United States Patent
Taylor

(10) Patent No.: US 11,470,963 B2
(45) Date of Patent: Oct. 18, 2022

(54) DISH WAND HOLDER

(71) Applicant: Kenny Taylor, Princeton, IN (US)

(72) Inventor: Kenny Taylor, Princeton, IN (US)

( * ) Notice: Subject to any disclaimer, the term of this patent is extended or adjusted under 35 U.S.C. 154(b) by 0 days.

(21) Appl. No.: 17/333,206

(22) Filed: May 28, 2021

(65) Prior Publication Data

US 2021/0368980 A1 Dec. 2, 2021

Related U.S. Application Data

(60) Provisional application No. 63/031,611, filed on May 29, 2020.

(51) Int. Cl.
*A47B 81/02* (2006.01)
*A47B 77/14* (2006.01)
*A47J 47/16* (2006.01)

(52) U.S. Cl.
CPC .............. *A47B 81/02* (2013.01); *A47B 77/14* (2013.01); *A47J 47/16* (2013.01)

(58) Field of Classification Search
CPC ....... A47B 81/02; A47B 77/14; A47F 7/0021; A47G 29/08; A47G 29/083; A47K 1/12; A47L 13/512; A47J 47/16; A47J 47/20; A46B 17/02; B44D 3/123
USPC ....... 211/66, 65, 70.6, 75; 248/205.5, 206.2, 248/200, 309.1, 309.3, 311.2, 110, 152, 248/113; D32/55; 220/736
See application file for complete search history.

(56) References Cited

U.S. PATENT DOCUMENTS

| | | | | |
|---|---|---|---|---|
| 2,202,242 A | * | 5/1940 | William | A47G 29/08 248/205.5 |
| 2,286,012 A | * | 6/1942 | Rochow | A47G 29/08 248/205.5 |
| 2,441,051 A | * | 5/1948 | Wilhelm | A47L 13/512 248/300 |
| 2,535,260 A | * | 12/1950 | Braswell | B44D 3/123 248/113 |
| 2,625,299 A | * | 1/1953 | Uhlig | B44D 3/123 220/736 |
| 2,662,717 A | * | 12/1953 | Johnson | A47J 47/16 211/32 |
| 2,788,153 A | * | 4/1957 | Broadbelt | B44D 3/14 220/759 |
| 2,833,419 A | * | 5/1958 | Trumpy | B25B 13/56 248/316.1 |
| 2,855,123 A | * | 10/1958 | Kintz | B44D 3/123 220/756 |
| 3,275,187 A | * | 9/1966 | Lamoureaux | B44D 3/123 15/236.01 |
| 3,531,073 A | * | 9/1970 | Cortina | B44D 3/123 248/113 |
| 3,794,285 A | * | 2/1974 | Barts | A47K 5/12 211/72 |

(Continued)

*Primary Examiner* — Jennifer E. Novosad
(74) *Attorney, Agent, or Firm* — Boudwin Intellectual Property; Daniel Boudwin

(57) ABSTRACT

A dish wand holder includes a front plate having a rear plate extending perpendicularly from an upper end of the front plate. A pair of tines extend from opposing ends of the upper end defining a gap therebetween. The gap is dimensioned to receive a handle of a dish wand therethrough. A fastener is affixed to a lower side of the rear plate, wherein the fastener removably secures the rear plate to a surface.

17 Claims, 4 Drawing Sheets

(56) References Cited

U.S. PATENT DOCUMENTS

| | | | | |
|---|---|---|---|---|
| 3,863,873 | A * | 2/1975 | Cushing | A47B 81/00 |
| | | | | 248/229.16 |
| 3,964,709 | A * | 6/1976 | LaBelle | A45D 34/00 |
| | | | | 222/164 |
| 4,014,453 | A * | 3/1977 | Tarnacki | B44D 3/123 |
| | | | | 248/110 |
| 4,278,225 | A * | 7/1981 | Phelps | A61M 5/008 |
| | | | | D8/371 |
| 4,343,172 | A * | 8/1982 | Nordlund | B25H 3/04 |
| | | | | 211/70.1 |
| 4,566,597 | A * | 1/1986 | Caputo | A47K 1/09 |
| | | | | 248/110 |
| 4,632,347 | A * | 12/1986 | Jurgich | A47J 43/287 |
| | | | | 24/570 |
| 4,660,245 | A * | 4/1987 | Anderson | B44D 3/006 |
| | | | | 220/736 |
| 4,696,447 | A * | 9/1987 | Strecker | F16M 13/022 |
| | | | | 248/314 |
| 4,830,198 | A * | 5/1989 | Colquitt | B44D 3/123 |
| | | | | 211/13.1 |
| 4,890,353 | A * | 1/1990 | Shannon | B44D 3/123 |
| | | | | 248/909 |
| 4,911,310 | A * | 3/1990 | Raishe | A47J 47/16 |
| | | | | 248/312 |
| 4,979,708 | A * | 12/1990 | Aoki | A47K 1/09 |
| | | | | 248/110 |
| 4,984,693 | A * | 1/1991 | Belokin, Jr. | A47F 5/0876 |
| | | | | D6/567 |
| 5,012,934 | A * | 5/1991 | Newhall | A47L 19/00 |
| | | | | D32/55 |
| 5,127,616 | A * | 7/1992 | Carney | A47J 47/16 |
| | | | | 248/37.3 |
| 5,180,066 | A * | 1/1993 | McArdle | A47G 23/0241 |
| | | | | 211/74 |
| 5,224,609 | A * | 7/1993 | Bauer | A47F 7/0021 |
| | | | | 211/70.6 |
| 5,297,766 | A * | 3/1994 | Hoffman | A47J 47/16 |
| | | | | 248/205.3 |
| 5,358,128 | A * | 10/1994 | Belokin | F25D 25/02 |
| | | | | 211/75 |
| 5,375,736 | A * | 12/1994 | Gonzalez | B44D 3/123 |
| | | | | 220/700 |
| D354,873 | S * | 1/1995 | Odbert | D6/566 |
| 5,507,414 | A * | 4/1996 | Ong | A47K 5/1214 |
| | | | | 222/173 |
| 5,758,853 | A * | 6/1998 | Perrin | A47K 5/12 |
| | | | | 248/311.2 |
| 5,865,325 | A * | 2/1999 | Comstock | A47K 10/08 |
| | | | | 248/302 |
| 6,003,691 | A * | 12/1999 | Owen | A47B 81/02 |
| | | | | 211/65 |
| 6,102,203 | A * | 8/2000 | Marro | A47K 1/09 |
| | | | | 206/362.1 |
| D450,540 | S * | 11/2001 | Romero | D7/601 |
| 6,330,948 | B1 * | 12/2001 | Leto | A47J 47/20 |
| | | | | 248/206.3 |
| 6,505,746 | B1 * | 1/2003 | Johnson | A47J 47/16 |
| | | | | 248/37.3 |
| 6,517,037 | B1 * | 2/2003 | Munoz | F24C 15/36 |
| | | | | 248/176.2 |
| 6,619,604 | B1 * | 9/2003 | Stillman | A47J 45/02 |
| | | | | 248/205.5 |
| 6,808,149 | B1 * | 10/2004 | Sendowski | A61J 1/16 |
| | | | | 248/312 |
| D548,416 | S * | 8/2007 | Gullicks | D32/42 |
| D551,513 | S * | 9/2007 | Fiorella | D7/619.1 |
| 7,377,004 | B2 * | 5/2008 | LeCompte | A47L 13/58 |
| | | | | 220/571.1 |
| 7,464,907 | B1 * | 12/2008 | Lane | A47K 1/09 |
| | | | | 248/312.1 |
| 9,107,526 | B2 * | 8/2015 | Rife | A47G 29/083 |
| D748,358 | S | 1/2016 | Coller et al. | |
| 9,414,717 | B2 * | 8/2016 | Tollasepp | A47J 47/20 |
| D772,649 | S * | 11/2016 | Kettavong | D7/378 |
| 9,668,611 | B2 * | 6/2017 | Zhitnitsky | A47J 36/34 |
| 9,756,985 | B2 * | 9/2017 | Knight, Sr. | A47J 47/16 |
| 9,808,123 | B1 * | 11/2017 | Brinkmann | F16M 13/022 |
| D844,274 | S | 3/2019 | Collins | |
| 11,009,308 | B2 * | 5/2021 | Ochs | F41B 5/14 |
| 2004/0124329 | A1 | 7/2004 | Scribner | |
| 2008/0012368 | A1 * | 1/2008 | Kent-Fawkes | A47J 47/16 |
| | | | | 294/137 |
| 2008/0185352 | A1 * | 8/2008 | O'Hara | A47L 19/02 |
| | | | | 211/13.1 |
| 2008/0191108 | A1 * | 8/2008 | Hsu | A47J 37/041 |
| | | | | 248/207 |
| 2008/0251475 | A1 * | 10/2008 | Lambert | A47K 1/09 |
| | | | | 211/65 |
| 2011/0027003 | A1 * | 2/2011 | Shaanan | A47L 13/44 |
| | | | | 401/261 |
| 2012/0024807 | A1 * | 2/2012 | Fullman | A47B 81/02 |
| | | | | 211/65 |
| 2012/0285879 | A1 | 11/2012 | Housley | |
| 2014/0034795 | A1 * | 2/2014 | Brinkmann | F16M 13/022 |
| | | | | 248/213.2 |
| 2014/0245533 | A1 | 9/2014 | Lee et al. | |
| 2014/0263909 | A1 * | 9/2014 | Tsai | A47J 47/16 |
| | | | | 248/313 |
| 2015/0047671 | A1 * | 2/2015 | Kordecki | A47K 1/09 |
| | | | | 211/65 |
| 2015/0144752 | A1 * | 5/2015 | Lim | A47K 5/13 |
| | | | | 248/205.5 |
| 2018/0084935 | A1 * | 3/2018 | Schwab | A47K 5/04 |
| 2021/0338014 | A1 * | 11/2021 | Russell | A47J 47/16 |
| 2021/0368980 | A1 * | 12/2021 | Taylor | A47B 77/14 |

* cited by examiner

DISH WAND HOLDER

CROSS REFERENCE TO RELATED APPLICATIONS

This application claims the benefit of U.S. Provisional Application No. 63/031,611 filed on May 29, 2020. The above identified patent application is herein incorporated by reference in its entirety to provide continuity of disclosure.

BACKGROUND OF THE INVENTION

The present invention relates to dish wand holders. More particularly, the present invention pertains to a dish wand holder removably securable to a sink via a fastener, wherein the dish wand holder supports the dish wand in an upright position.

Many individuals use various devices when cleaning dirty dishes, such as dish wands, which typically include a sponge or other scrubbing surface attached to a handle. When properly cared for, dish wands can be used repeatedly before requiring replacement. However, when dish wands are not properly stored between uses, bacteria can build up within the sponge of the dish wand. For example, when the dish wand is rested horizontally on a sink or the surrounding area, bacteria on those surfaces is transferred to the dish wand. Additionally, resting the dish wand in this way further inhibits the drying of the sponge or scrubbing surface, which provides a fertile breeding ground for bacteria. If a user continues to use the dish wand, the bacteria on the scrubbing surface is transferred to the dishes, potentially leading to the user contracting an illness. In some instances, dish wands further include an internal soap reservoir to allow a user to dispense soap onto the scrubbing surface of the dish wand for application to the dirty dishes. Resting the dish wand horizontally on the sink or the surrounding area may cause the soap within the reservoir to leak, which can result in a length clean up process in addition to wasted soap. Therefore, a device that can readily secure to a sink to retain a dish wand in an upright position is desired.

In light of the devices disclosed in the known art, it is submitted that the present invention substantially diverges in design elements from the known art and consequently it is clear that there is a need in the art for an improvement to existing dish wand holders. In this regard, the instant invention substantially fulfills these needs.

SUMMARY OF THE INVENTION

In view of the foregoing disadvantages inherent in the known types of dish wand holders now present in the known art, the present invention provides a dish wand holder wherein the same can be utilized for providing convenience for the user when supporting a dish wand holder in an upright position within a sink.

The present system comprises a front plate having a rear plate extending perpendicularly from an upper end of the front plate. A pair of tines extend from opposing ends of the upper end defining a gap therebetween. The gap is dimensioned to receive a handle of a dish wand therethrough. A fastener is affixed to a lower side of the rear plate, wherein the fastener removably secures the rear plate to a surface. In some embodiments, the rear plate is unitary with the front plate and comprises a section of the front plate cut between the pair of tines and bent perpendicular to extend from a rear side of the front plate.

In some embodiments, the gap comprises a width greater than that handle of the dish wand and less than a head of the dish wand. In another embodiment, an aperture is disposed through the rear plate, wherein the aperture is dimensioned to removably receive the fastener therein. In other embodiments, a width of the aperture decreases from a proximal end of the aperture to a distal end of the aperture. In yet another embodiment, the aperture is oriented such that a linear distance between the proximal end and the front plate is less than a linear distance between the distal end and the front plate. In some embodiments, a length of the pair of tines is equivalent to a length of the rear plate. In other embodiments, the pair of tines are coplanar with the front plate. In yet another embodiment, the front plate comprises a length greater than a length of the rear plate.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
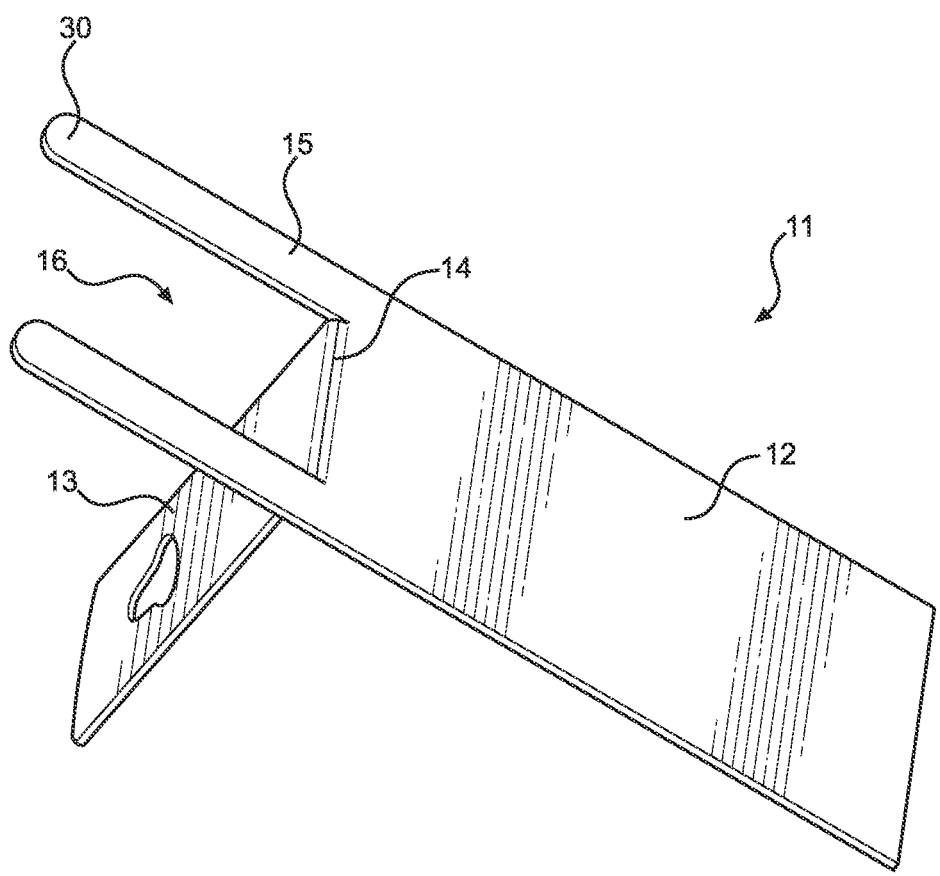
FIG. 1 shows a perspective view of an embodiment of the dish wand holder.

Reference is made herein to the attached drawings. Like reference numerals are used throughout the drawings to depict like or similar elements of the dish wand holder. The figures are intended for representative purposes only and should not be considered to be limiting in any respect.

Figure 4:
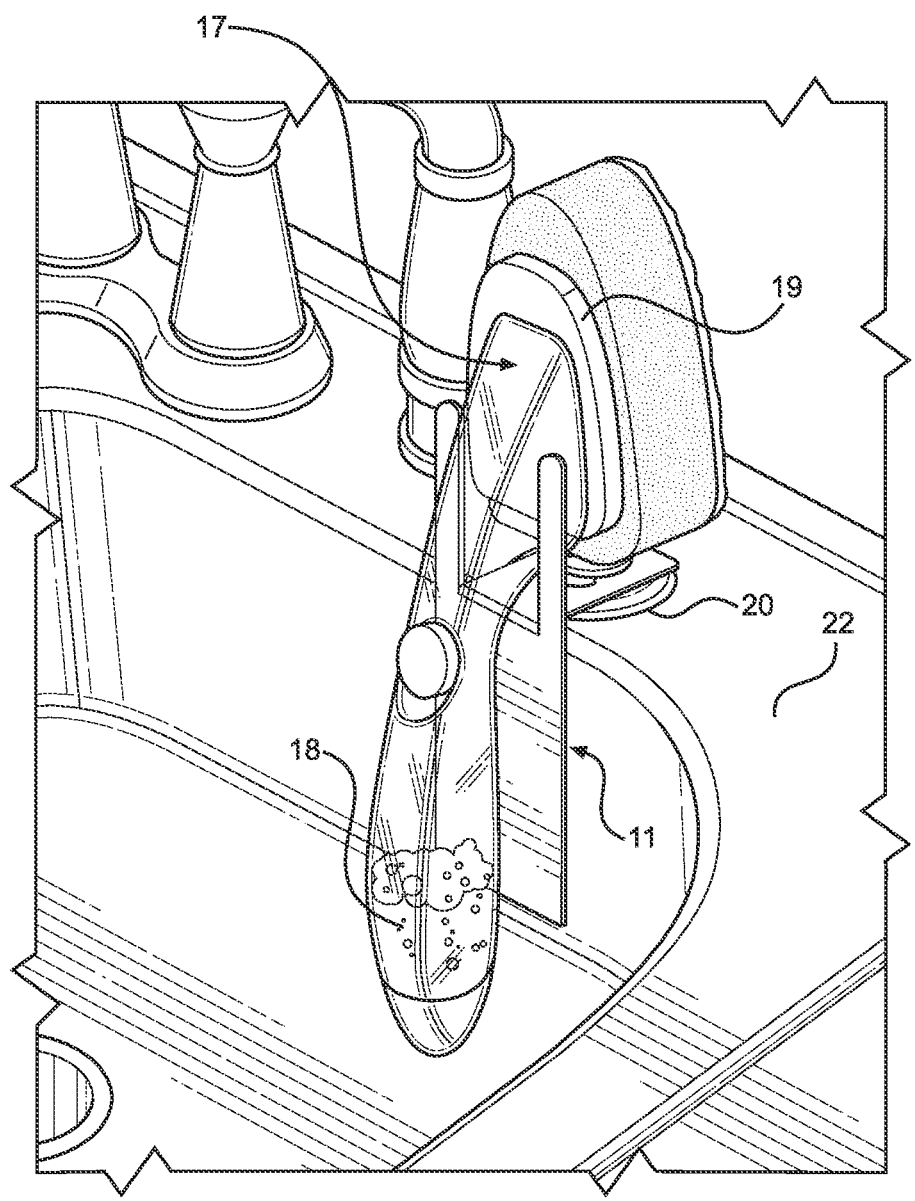
FIG. 4 shows a perspective view of an embodiment the dish wand holder in use.

Referring now to FIG. 1, there is shown a perspective view of an embodiment of the dish wand holder. The dish wand holder 11 comprises a front plate 12 affixed to a rear plate 13, wherein the rear plate 13 extends perpendicularly from an upper end 14 of the front plate. In the illustrated embodiment, the front plate 12 and the rear plate 13 comprise a unitary structure, wherein the rear plate 13 comprises a section of the front plate 12 cut therefrom and bent rearwardly relative to the front plate 12 to form a perpendicular angle therewith. As such, the upper end 14 of the front plate 12 comprises an arcuate exterior surface, thereby minimizing damage to a dish wand (as shown in FIG. 4, 17) secured to the dish wand holder 11 during use. Additionally, the unitary structure increases the structural integrity of the device, thereby reducing wear and tear experienced by the dish wand holder 11. The perpendicular relationship between the front and rear plates 12, 13 allow the dish wand holder 11 to rest on an edge of a sink, countertop, or other support surface (as shown in FIG. 4, 22).

A pair of tines 15 extend from opposing ends of the upper end 14 of the front plate 12, such that the pair of tines 15 define a gap 16 therebetween. The gap 16 is dimensioned to receive a dish wand handle therethrough, such that a dish wand is retained on the dish wand holder 11 during use. In embodiments where the front plate 12 is unitary with the rear plate 13, the rear plate 13 comprises the section of the front plate 12 disposed between the pair of tines 15, such that the cuts made to form the rear plate 13 are made adjacent to the pair of tines 15. As such, the gap 16 comprises an identical surface area as that of the rear plate 13. In this manner, the dish wand holder 11 can be efficiently constructed from a singular metal plate. In the illustrated embodiment, each of the pair of tines 15 comprises a rounded tip 30, wherein the rounded tip 30 is configured to minimize the risk of injury to the user when securing or retrieving the dish wand from the dish wand holder 11.

Figure 2:
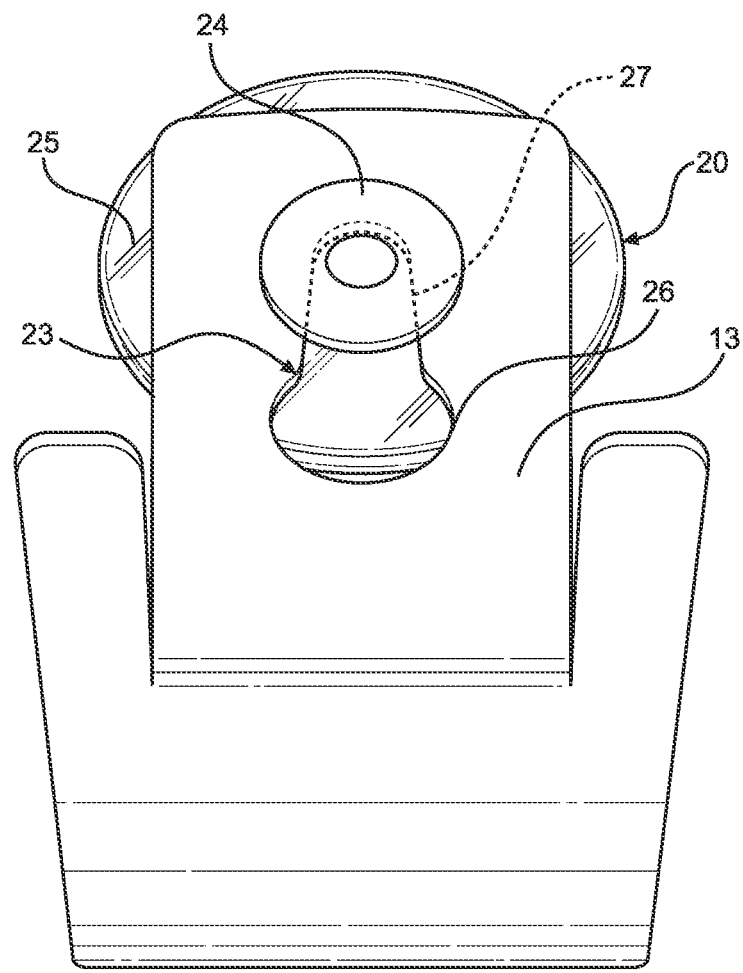
FIG. 2 shows a close-up view of the rear plate of an embodiment of the dish wand holder.
Figure 3:
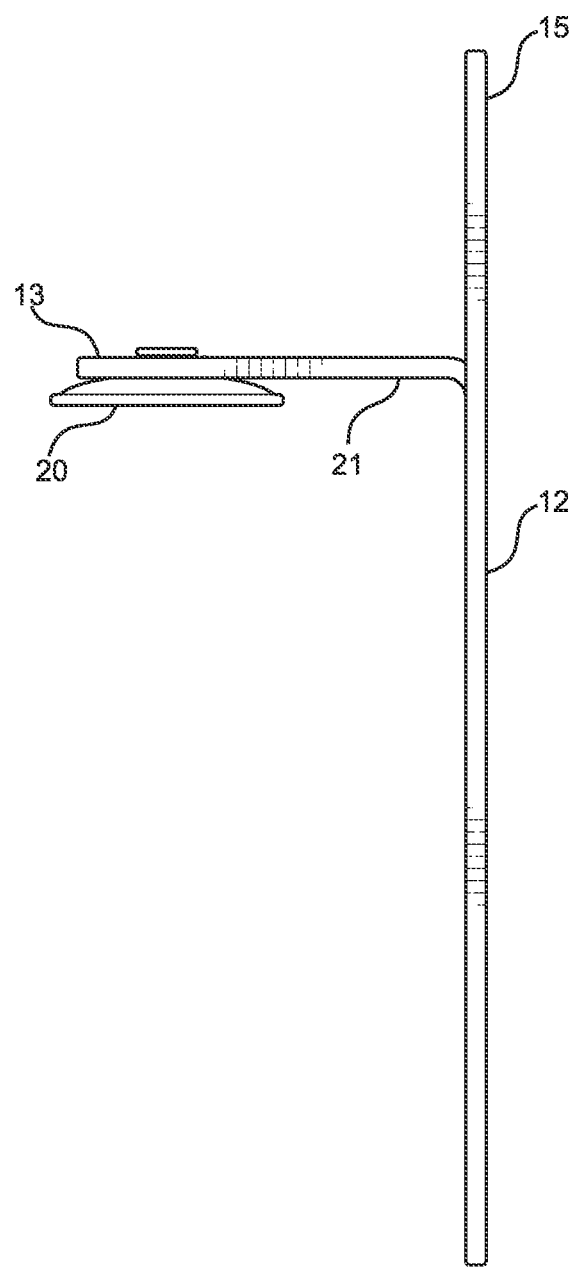
FIG. 3 shows a side view of an embodiment of the dish wand holder.

Referring now to FIG. 2, there is shown a close-up view of the rear plate of an embodiment of the dish wand holder. In the illustrated embodiment, an aperture 23 is disposed through the rear plate 13, wherein the aperture 23 is dimensioned to removably secure a fastener 20 therein. In the shown embodiment, the fastener 20 comprises a suction cup having a stem 24 affixed to a cup 25, wherein the stem 24 extends through the aperture 23 to secure the fastener 20 to the rear plate 13. In other embodiments, the fastener 20 is permanently affixed to a lower side (as shown in FIG. 3, 21) of the rear plate 13, and can comprise a variety of fasteners 20, including hook and loop fasteners and magnetic fasteners. In some such embodiments, the fastener 20 comprises a magnetic fastener integral within the rear plate 13. In this way, the rear plate 13 is securable to a support surface via the fastener 20. In the shown embodiment, the aperture 23 further comprises a proximal end 26 having a width greater than a width of a distal end 27 of the aperture 23. In this manner, the fastener 20 can be inserted into the proximal end 26 and frictionally engaged within the distal end 27 to secure the fastener 20 therein. In the shown embodiment, the aperture 23 is oriented along a longitudinal axis of the rear plate 13, wherein a linear distance between the proximal end 26 and the front plate is less than a linear distance between the distal end 27 and the front plate. In this manner, the weight of a dish wand secured to the dish wand holder further secures the fastener 20 within the distal end 27 rather than disengaging the fastener 20 from the distal end 27.

Referring now to FIG. 3, there is shown a side view of an embodiment of the dish wand holder. The rear plate 13 is disposed perpendicularly to the front plate 12 to allow the dish wand holder to secure over the edge of a sink or countertop. As such, when in use, the rear plate 13 rests substantially parallel to an upper wall of a sink basin or countertop, while the front plate 12 rests substantially parallel to an inner wall of the sink basin or outer wall of the countertop. In the shown embodiment, the pair of tines 15 are disposed in a coplanar relationship with the front plate 12, such that the dish wand is aligned along the front plate 12 when secured to the dish wand holder. In the shown embodiment, the fastener 20 extends from a lower side 21 of the rear plate 13, such that the fastener 20 removably secures the rear plate 13 to the support surface.

Referring now to FIG. 4, there is shown a perspective view of an embodiment the dish wand holder in use. In one use, the dish wand holder 11 is secured to a support surface 22, such as a sink as shown in the illustrated embodiment. In the shown embodiment, the fastener 20 removably secures the rear plate to the support surface 22 such that the front plate extends into a sink basin. When properly affixed to the support surface 22, the pair of tines 15 extend upwardly from the support surface 22 to ensure that a dish wand 17 secured to the dish wand holder 11 remains in an upright position. The dish wand 17 can be secured to the dish wand holder 11 by inserting a handle 18 of the dish wand 17 through the gap defined between the pair of tines 15 such that a head 19 of the dish wand 17 remains on an opposing side of the pair of tines 15 relative to the handle 18. As the head 19 of the dish wand 17 comprises a larger diameter than that of the gap, the dish wand 17 will be supported against the pair of tines 15 such that the dish wand 17 remains in an upright position. In the upright position, the head 19 of the dish wand 17 is exposed entirely to air for expedient drying while simultaneously preventing the head 19 from contacting the surrounding area. In this manner, bacteria, or other pathogens on the surfaces in the surrounding area are not transferred to the head 19. Additionally, as the length of time for drying the head 19 is reduced, bacterial growth within a damp environment of an improperly dried dish wand 17 is minimized. Furthermore, in dish wands 17 having an interior soap reservoir, the upright storage position provided by the dish wand holder 11 further minimizes the risk of leakage from the interior of the reservoir.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dish wand holder, comprising:
    a front plate having a rear plate extending perpendicularly from an upper end of the front plate;
    a pair of tines extending from opposing ends of the upper end defining a gap therebetween;
    wherein the front plate, the rear plate, and the pair of tines comprise a monolithic construction;
    wherein the rear plate comprises an identical size and shape as the gap disposed between the pair of tines;
    wherein the gap is dimensioned to receive a handle of a dish wand therethrough;
    a fastener affixed to a lower side of the rear plate, wherein the fastener removably secures the rear plate to a surface.

2. The dish wand holder of claim 1, further comprising an aperture through the rear plate, wherein the aperture is dimensioned to removably receive the fastener therein.

3. The dish wand holder of claim 2, wherein a width of the aperture decreases from a proximal end of the aperture to a distal end of the aperture.

4. The dish wand holder of claim 3, wherein the aperture is oriented such that a linear distance between the proximal end and the front plate is less than a linear distance between the distal end and the front plate.

5. The dish wand holder of claim 1, wherein a length of the pair of tines is equivalent to a length of the rear plate.

6. The dish wand holder of claim 1, wherein each of the pair of tines comprises a rounded tip.

7. The dish wand holder of claim 1, wherein the pair of tines are coplanar with the front plate.

8. The dish wand holder of claim 1, wherein the front plate comprises a length greater than a length of the rear plate.

9. A dish wand holder, comprising:
- a front plate having a rear plate extending perpendicularly from an upper end of the front plate;
- a pair of tines extending from opposing ends of the upper end defining a gap therebetween;
- wherein the rear plate is monolithic with the front plate and the pair of tines;
- wherein the rear plate comprises a section of the front plate cut between the pair of tines and bent perpendicularly to extend from a rear side of the front plate;
- wherein the rear plate comprises an identical size and shape as the gap disposed between the pair of tines;
- wherein the gap is dimensioned to receive a handle of a dish wand therethrough;
- a fastener affixed to a lower side of the rear plate, wherein the fastener removably secures the rear plate to a surface.

10. The dish wand holder of claim 9, further comprising an aperture through the rear plate, wherein the aperture is dimensioned to removably receive the fastener therein.

11. The dish wand holder of claim 10, wherein a width of the aperture decreases from a proximal end of the aperture to a distal end of the aperture.

12. The dish wand holder of claim 11, wherein the aperture is oriented such that a linear distance between the proximal end and the front plate is less than a linear distance between the distal end and the front plate.

13. The dish wand holder of claim 9, wherein a length of the pair of tines is equivalent to a length of the rear plate.

14. The dish wand holder of claim 9, wherein each of the pair of tines comprises a rounded tip.

15. The dish wand holder of claim 9, wherein the pair of tines are coplanar with the front plate.

16. The dish wand holder of claim 9, wherein the front plate comprises a length greater than a length of the rear plate.

17. A dish wand holder, consisting of:
- a front plate having a rear plate extending perpendicularly from an upper end of the front plate;
- a pair of tines extending from opposing ends of the upper end defining a gap therebetween;
- wherein the rear plate is monolithic with the front plate and the pair of tines;
- wherein the rear plate is defined by a section of the front plate cut between the pair of tines and bent perpendicularly to extend from a rear side of the front plate;
- wherein the rear plate consists of an identical size and shape as the gap disposed between the pair of tines;
- wherein the gap is dimensioned to receive a handle of a dish wand therethrough;
- a fastener affixed to a lower side of the rear plate, wherein the fastener removably secures the rear plate to a surface.

* * * * *